US012612057B2

(12) United States Patent
Wakiyama et al.

(10) Patent No.: US 12,612,057 B2
(45) Date of Patent: Apr. 28, 2026

(54) INFORMATION PROCESSING DEVICE, INFORMATION PROCESSING METHOD, PROGRAM, DRIVING CONTROL DEVICE, DRIVING CONTROL METHOD, AND PROGRAM

(71) Applicant: BRIDGESTONE CORPORATION, Tokyo (JP)

(72) Inventors: Tadashi Wakiyama, Tokyo (JP); Isao Kuwayama, Tokyo (JP); Kazuo Uchida, Tokyo (JP); Takao Kobayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 124 days.

(21) Appl. No.: 18/705,993

(22) PCT Filed: Jul. 26, 2022

(86) PCT No.: PCT/JP2022/028822
§ 371 (c)(1),
(2) Date: Apr. 30, 2024

(87) PCT Pub. No.: WO2023/100416
PCT Pub. Date: Jun. 8, 2023

(65) Prior Publication Data
US 2025/0010866 A1      Jan. 9, 2025

(30) Foreign Application Priority Data
Nov. 30, 2021     (JP) ................................. 2021-194979

(51) Int. Cl.
*B60W 50/02*            (2012.01)

(52) U.S. Cl.
CPC ..... *B60W 50/0225* (2013.01); *B60W 2530/20* (2013.01); *B60W 2556/45* (2020.02); *B60W 2756/10* (2020.02)

(58) Field of Classification Search
CPC ......... B60W 50/0225; B60W 2530/20; B60W 2556/45; B60W 2756/10;
(Continued)

(56) References Cited

U.S. PATENT DOCUMENTS 11,549,808 B2     1/2023   Suzuki et al.
11,549,809 B2     1/2023   Sekizawa
(Continued)

FOREIGN PATENT DOCUMENTS

DE       102014223902 A1 *   5/2016   ............ B60W 40/02
JP            2002162235 A    6/2002
(Continued)

OTHER PUBLICATIONS

"Identification and estimation of statistical functionals using incomplete data" by J. Horowitz et al., Journal of Econometrics 132 (2006) 445-459 (Year: 2006).*
(Continued)

*Primary Examiner* — Kito R Robinson
*Assistant Examiner* — Tanya C Sienko
(74) *Attorney, Agent, or Firm* — KENJA IP LAW PC

(57)          ABSTRACT

In order to improve vehicle controllability, an information processing device 1 that is able to communicate with a vehicle 5 via a network includes a controller, the controller executing operations including acquiring tire-related information, calculating a driving control parameter based on the tire-related information, and transmitting the driving control parameter to the vehicle 5.

18 Claims, 8 Drawing Sheets

(58) Field of Classification Search

CPC . B60W 2050/0031; B60W 2050/0033; B60W 2050/0082; B60W 60/00; B60W 30/18; B60W 2552/40; B60C 23/04; G08G 1/16

See application file for complete search history.

(56) References Cited

U.S. PATENT DOCUMENTS

| | | | |
|---|---|---|---|
| 2020/0250899 A1 | 8/2020 | Sakakibara | |
| 2020/0290625 A1* | 9/2020 | Berntorp | B60W 30/18172 |
| 2024/0185654 A1* | 6/2024 | Toyoda | B60C 23/20 |

FOREIGN PATENT DOCUMENTS

| | | | | |
|---|---|---|---|---|
| JP | 2016200931 A | 12/2016 | | |
| JP | 2017204071 A | 11/2017 | | |
| JP | 2018167645 A | 11/2018 | | |
| JP | 2019070626 A | 5/2019 | | |
| JP | 2019081531 A | 5/2019 | | |
| JP | 2019192157 A | 10/2019 | | |
| JP | 2020122753 A | 8/2020 | | |
| WO | 2018230174 A1 | 12/2018 | | |
| WO | WO-2020205703 A1 * | 10/2020 | | G06N 7/01 |

OTHER PUBLICATIONS

Machine Translation of DE102014223902 downloaded from IP.com (Year: 2025).*

Dec. 9, 2024, search result of the Extended European Search Report issued by the European Patent Office in the corresponding European Patent Application No. 22900851.1.

May 2, 2024, International Preliminary Report on Patentability issued in the International Patent Application No. PCT/JP2022/028822.

Oct. 18, 2022, International Search Report issued in the International Patent Application No. PCT/JP2022/028822.

* cited by examiner

| VEHICLE IDENTIFICATION INFORMATION | TIRE-RELATED INFORMATION | DRIVING CONTROL PARAMETER |
|---|---|---|
| V01 | T01 | D01 |
| V02 | T02 | D02 |
| ⋮ | ⋮ | ⋮ |

INFORMATION PROCESSING DEVICE, INFORMATION PROCESSING METHOD, PROGRAM, DRIVING CONTROL DEVICE, DRIVING CONTROL METHOD, AND PROGRAM

CROSS-REFERENCE TO RELATED APPLICATION

The present application claims priority to and the benefit of Japanese Patent Application No. 2021-194979 filed Nov. 30, 2021, the entire contents of which are incorporated herein by reference.

TECHNICAL FIELD

The present disclosure relates to an information processing device, an information processing method, a program, a driving control device, a driving control method, and a program.

BACKGROUND

Conventional technology is known to limit automated driving of a vehicle when the condition of the vehicle's tires is determined to be unsuitable for automated driving (for example, see Patent Literature (PTL) 1).

CITATION LIST

Patent Literature

PTL 1: JP 2018-167645 A

SUMMARY

Technical Problem

The background art mentioned above does not take into account tire condition in vehicle control.

In view of such circumstances, it would be helpful to provide an information processing device, an information processing method, a program, a driving control device, a driving control method, and a program that are able to improve controllability of a vehicle.

Solution to Problem

An information processing device according to an embodiment of the present disclosure is an information processing device able to communicate with a vehicle via a network, comprising a controller, the controller being configured to execute operations comprising:

acquiring tire-related information;

calculating a driving control parameter based on the tire-related information; and transmitting the driving control parameter to the vehicle.

An information processing method according to an embodiment of the present disclosure is an information processing method executable by an information processing device able to communicate with a vehicle via a network, the information processing method comprising:

acquiring tire-related information;

calculating a driving control parameter based on the tire-related information; and transmitting the driving control parameter to the vehicle.

A program according to an embodiment of the present disclosure is a program configured to cause a computer to function as the information processing device described above.

A driving control device according to an embodiment of the present disclosure is a driving control device able to communicate with an information processing device via a network, the driving control device being configured to execute operations comprising:

acquiring from the information processing device a driving control parameter calculated based on tire-related information; and controlling driving of a vehicle based on the driving control parameter.

A driving control method according to an embodiment of the present disclosure is a driving control method executable by a driving control device able to communicate with an information processing device via a network, the driving control method comprising:

acquiring from the information processing device a driving control parameter calculated based on tire-related information; and controlling driving of a vehicle based on the driving control parameter.

A program according to an embodiment of the present disclosure is a program configured to cause a computer to function as the driving control device described above.

Advantageous Effect

According to the information processing device, the information processing method, the program, the driving control device, the driving control method, and the program according to an embodiment of the present disclosure, the controllability of a vehicle may be improved.

BRIEF DESCRIPTION OF THE DRAWINGS

In the accompanying drawings:

FIG. 3 is a block diagram illustrating a first vehicle;

FIG. 4 is a block diagram illustrating a second vehicle;

FIG. 5 is a diagram illustrating a data structure of a tire-related information database (DB);

DETAILED DESCRIPTION

Figure 1:
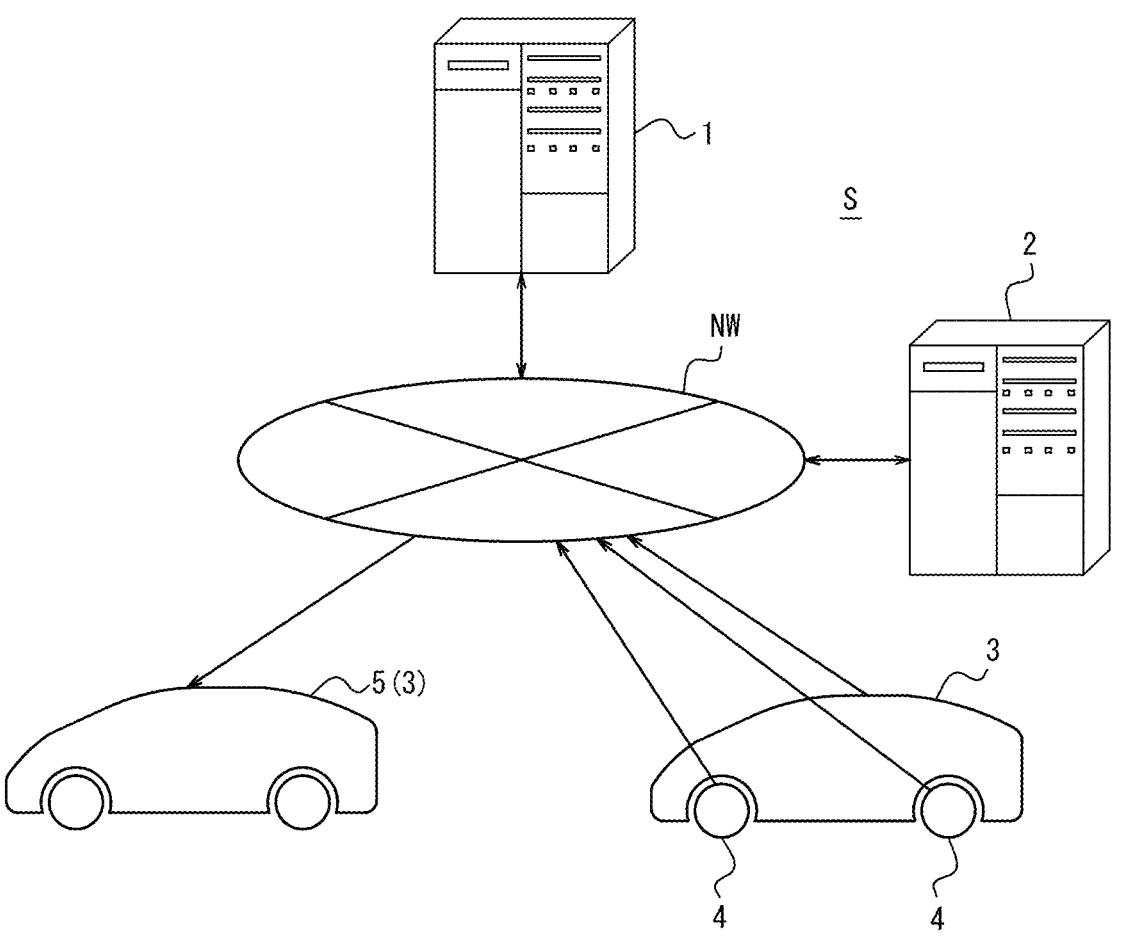
FIG. 1 is a schematic diagram of an information processing system according to an embodiment.

FIG. 1 is a schematic diagram of an information processing system S according to an embodiment. The information processing system S includes an information processing device 1, an external information processing device 2, a first vehicle 3, tires 4 mounted on the first vehicle 3, and a second vehicle 5. The information processing device 1, the external information processing device 2, the first vehicle 3, the tires 4, and the second vehicle 5 are able to communicate with each other via a network NW. The network NW includes, for example, a mobile communication network or the Internet.

For simplicity of explanation, the information processing device 1 is illustrated as one device in FIG. 1. However, the information processing device 1 is not limited to being one device. For example, a process executed by the information processing device 1 may be executed by the information processing device 1 as multiple distributed devices.

The information processing device 1 is installed in a facility dedicated to a business operator or in a facility such as a data center. The information processing device 1 is computer such as a server belonging to a cloud computing system or other computing system. The information processing device 1 may be a server that supports provision of a service by a business operator. As an alternative example, the information processing device 1 may be installed in the first vehicle 3 or the second vehicle 5. Another cloud computing system may intervene between the information processing device 1 and the first vehicle 3 or the second vehicle 5.

Figure 2:
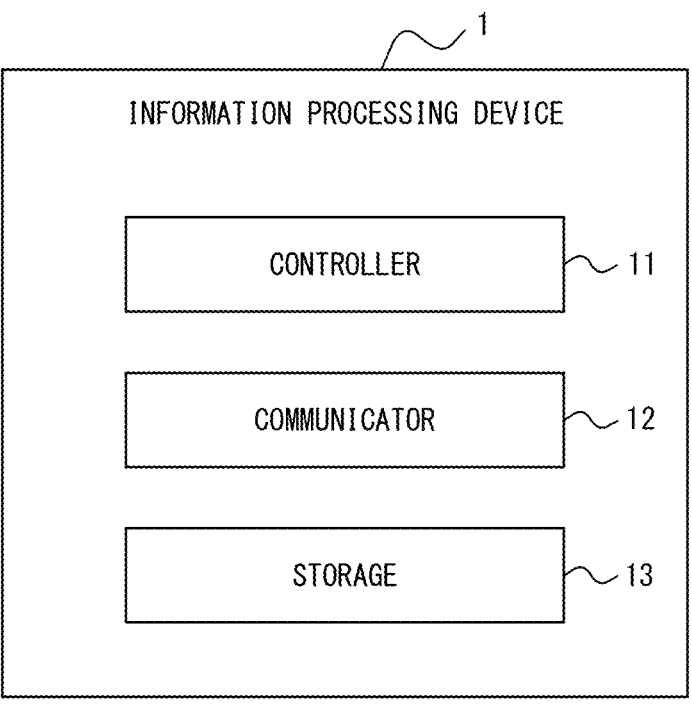
FIG. 2 is a block diagram illustrating a structure of an information processing device.

Internal structure of the information processing device 1 is described in detail, with reference to FIG. 2.

The information processing device 1 includes a controller 11, a communicator 12, and a storage 13. Components of the information processing device 1 are communicatively connected to each other via dedicated lines, for example.

The controller 11 includes, for example, a central processing unit (CPU) or one or more general-purpose processors, including a micro processing unit (MPU). The controller 11 may include one or more dedicated processors specialized for specific processing. Instead of a processor, the controller 11 may include one or more dedicated circuits. Each dedicated circuit may be, for example, a field-programmable gate array (FPGA) or an application specific integrated circuit (ASIC).

The communicator 12 includes one or more communication modules compatible with one or more wired or wireless local area network (LAN) standards for connection to a network. The communicator 12 may include modules for one or more mobile communication standards, including long term evolution (LTE), fourth generation (4G), or fifth generation (5G). The communicator 12 may include communication modules and the like that support one or more short-range communication standards or specifications, including Bluetooth® (Bluetooth is a registered trademark in Japan, other countries, or both), AirDrop® (AirDrop is a registered trademark in Japan, other countries, or both), IrDA, ZigBee® (ZigBee is a registered trademark in Japan, other countries, or both), Felica® (Felica is a registered trademark in Japan, other countries, or both), or RFID. The communicator 12 transmits and receives any information via the network.

The storage 13 is, for example, semiconductor memory, magnetic memory, optical memory, or at least RAM or ROM of one of these examples. RAM is, for example, SRAM or DRAM. ROM is, for example, EEPROM. The storage 13 may function, for example, as a main storage device, an auxiliary storage device, or a cache memory. The storage 13 may store information on the results analyzed or processed by the controller 11. The storage 13 may store information and the like related to operation or control of the information processing device 1. The storage 13 may store a system program, an application program, embedded software, and the like.

The external information processing device 2 is provided external to the information processing device 1. The description of the hardware structure of the external information processing device 2 is identical to the description of the hardware structure of the information processing device 1. Accordingly, the description is not repeated here.

The external information processing device 2 may be, for example, a device that remotely monitors tires by periodically measuring tire-related information from a device set on the wheel or the like of any tire. The tire-related information here may include at least one of the following:

Wear condition

Load (wheel load)

Internal pressure/temperature

Tire type

As an alternative example, the external information processing device 2 may be a device that provides a map platform. In this case, the external information processing device 2 collects the following information as tire-related information:

Condition of road surface under another vehicle traveling in front of the first vehicle 3

Temperature of region in which the first vehicle 3 is traveling

The first vehicle 3 includes any type of automobile, for example, gasoline, diesel, HEV, PHEV, BEV, FCEV, and the like. "HEV" is an abbreviation for hybrid electric vehicle. "PHEV" is an abbreviation for plug-in hybrid electric vehicle. "BEV" is an abbreviation for battery electric vehicle. "FCEV" is an abbreviation for fuel cell electric vehicle. Driving of the first vehicle 3 may be automated to any level. The level of automation is, for example, any of Level 1 to Level 5 in the SAE levels. "SAE" is an abbreviation for Society of Automotive Engineers. As an alternative example, the first vehicle 3 may be driven by a driver.

Figure 3:
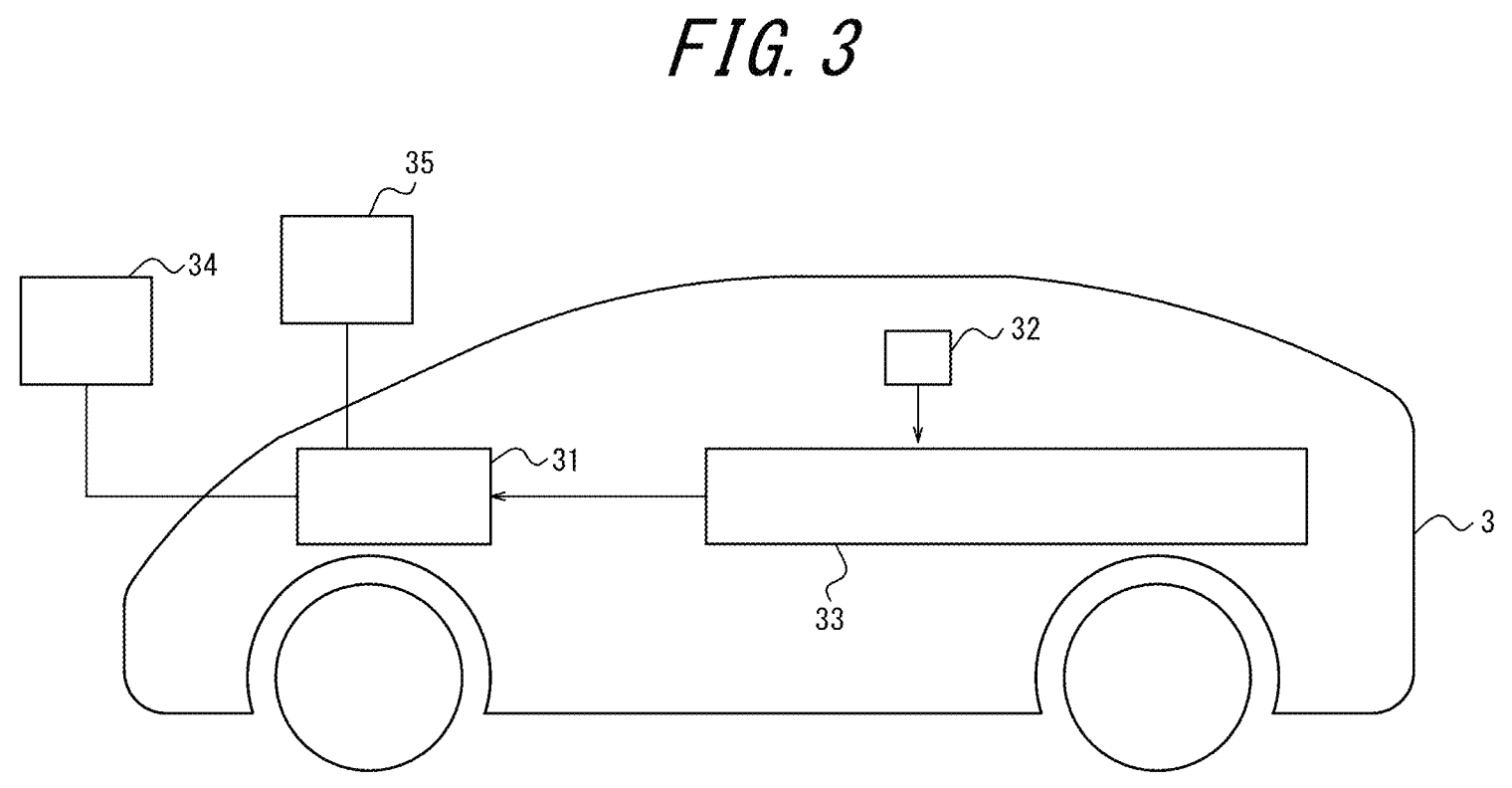

Internal structure of the first vehicle 3 is described in detail, with reference to FIG. 3.

The first vehicle 3 includes a driving control device 31, an electronic control unit (ECU) 32, and a controller area network (CAN) bus 33. The driving control device 31 may be operated by a user device 34, a robocar PC (Personal Computer) 35, or the like.

The driving control device 31 is, for example, an automated driving system (ADS). The driving control device 31 acquires vehicle travel data (for example, G, steering angle, vehicle speed, and the like) from the ECU 32 regarding steering, acceleration, shifting, braking, vehicle speed, distance, and the like for the first vehicle 3 via the CAN bus 33.

The driving control device 31 acquires tire-related information about the tires 4 and transmits to the information processing device 1. Tire-related information may include, for example, at least one of the following:

Wear condition (determined from vehicle height or camera)

Load (wheel load)

Tire type (determined from camera or RFID) (ID of tire type may be transmitted to the information processing device 1)

Internal pressure/temperature (determined from tire pressure monitoring system (TPMS))

Road surface condition (determined from camera, G sensor or CAN data)

Vehicle travel data described above

When the vehicle travel data is transmitted to the information processing device 1, the vehicle travel data may be raw data. The vehicle travel data, along with other tire-related information, may be used by sensor fusion to calculate a driving control parameter.

The tires 4 are one or more tires mounted on the first vehicle 3. Each of the tires 4 acquires tire-related information and transmits to the information processing device 1. The tire-related information may include at least one of the following:

Wear condition (determined from in-tire G sensor or travel noise)

Load/wheel load (determined from in-tire G sensor or the like)

Internal pressure/temperature (determined from TPMS)

Road surface condition (determined from in-tire G sensor and strain sensor)

A method for determining road surface condition from a G sensor disposed in the tire 4 is described in WO 2006/135090 A1. A method for estimating road surface friction condition from a strain sensor disposed in the tire 4 is described in JP 2005-345238 A. As an alternative example of a method for estimating road surface condition, one or more strain sensors may be disposed on a side portion of the wheel or the tire 4 rather than in the tire 4.

The second vehicle 5 includes any type of automobile, for example, diesel, HEV, PHEV, BEV, FCEV, and the like. Driving of the second vehicle 5 may be automated to any level. The level of automation is, for example, any of Level 1 to Level 5 in the SAE levels. "SAE" is an abbreviation for Society of Automotive Engineers. As an alternative example, the second vehicle 5 may be driven by a driver.

Figure 4:
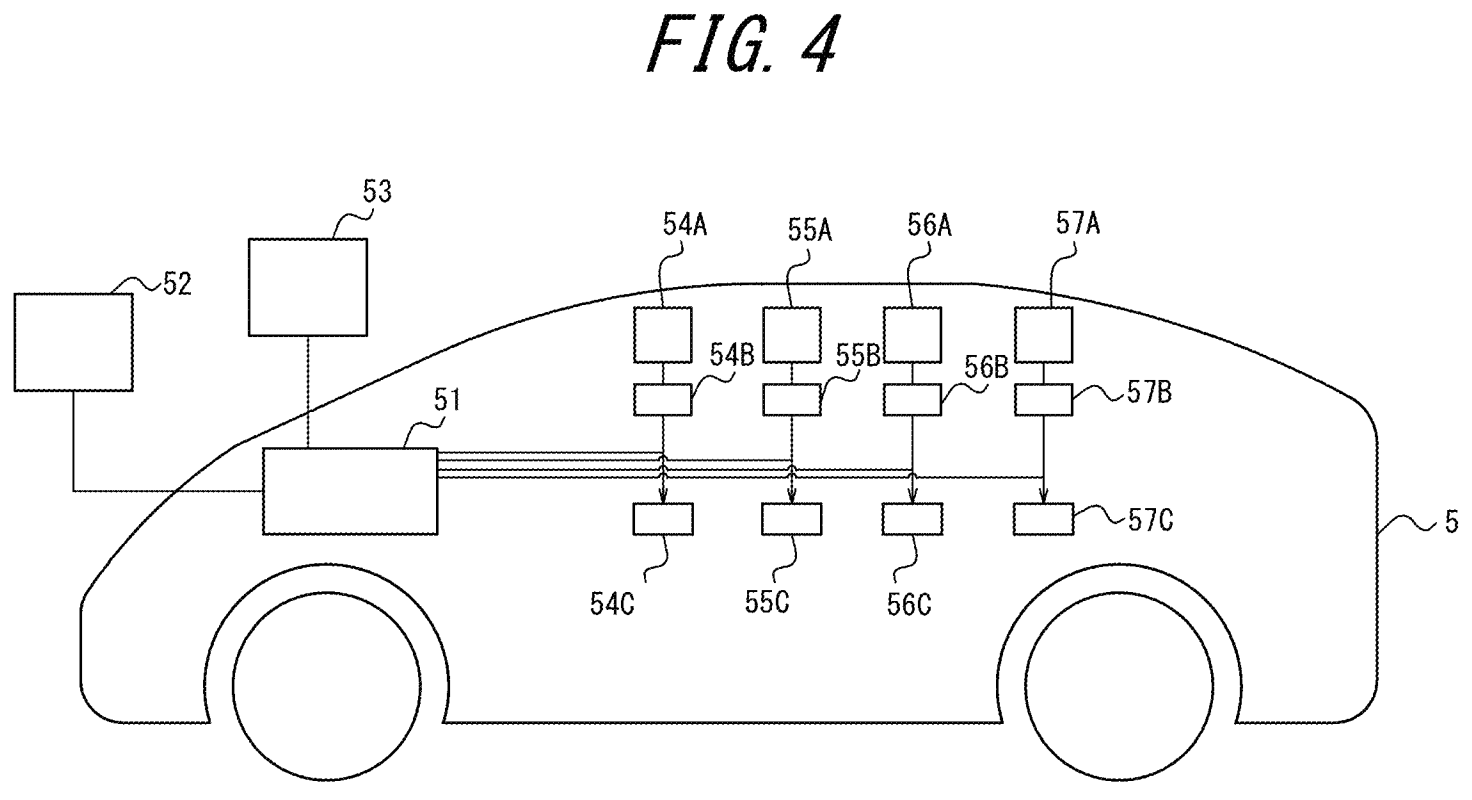

Internal structure of the second vehicle 5 is described in detail, with reference to FIG. 4.

The second vehicle 5 includes a driving control device 51, an accelerator 54A, a brake 55A, steering 56A, shift 57A, sensors 54B to 57B, and ECUs 54C to 57C. The driving control device 51 may be operated by a user device 52, a robocar PC 53, or the like.

The driving control device 51 is, for example, an ADS. Upon acquiring the driving control parameter from the information processing device 1, the driving control device 51 electrically intervenes with respect to signals from each of the sensors 54B to 57B to the ECUs 54C to 57C. In this way, the driving control device 51 controls the driving of the second vehicle 5.

For ease of explanation, the first vehicle 3 and the second vehicle 5 are depicted as separate vehicles. As an alternative example, the first vehicle 3 and the second vehicle 5 may be the same vehicle. That is, the controller 11 may acquire the tire-related information from the first vehicle 3, calculate the driving control parameter, and transmit the driving control parameter so calculated to the first vehicle 3.

The following is a detailed description of processing executed by the information processing system S according to the present embodiment.

[Acquiring Tire-Related Information]

The controller 11 of the information processing device 1 acquires the tire-related information. The tire-related information is acquired from at least one of the external information processing device 2, the first vehicle 3, or the tire 4.

The timing of acquisition may be any of the following:

When the first vehicle 3 makes a request (for example, at operating system (OS) startup)

When a defined period of time has elapsed since a time stamp of each piece of the tire-related information When an environmental change (for example, a rise in tire rubber temperature) is detected The controller 11 may request that the temperature information of the tire 4 be transmitted immediately after the first vehicle 3 travels until the temperature of the tire 4 reaches a steady value. The temperature of the tire 4 may be detected from a TPMS, external temperature, solar radiation situation, and the like.

[Calculation of Driving Control Parameter]

The controller 11 calculates a driving control parameter based on the tire-related information. When the tire-related information is acquired from a vehicle (for example, the first vehicle 3), the controller 11 acquires the tire-related information and vehicle identification information from the vehicle. As illustrated in FIG. 5, the controller 11 stores the tire-related information and the driving control parameter in association with the vehicle identification information in the storage 13.

The driving control parameter may be calculated from a correlation map between the tire-related information and the driving control parameter, or may be calculated based on a function. The controller 11 may update the correlation map or the function using the vehicle travel data such as CAN data (see below). The correlation map or the function may be maintained in the storage 13 for each piece of the tire-related information. The correlation map or the function may be calculated from actual measured data of the tire-related information and the vehicle travel data, or from a tire model.

When at least some of the tire-related information cannot be acquired, the controller 11 may calculate the driving control parameter corresponding to a maximum risk tire situation. For example, the controller 11 may calculate the driving control parameter with a smaller gain for the front and rear directions of the vehicle. The controller 11 may calculate different driving control parameters for the front-rear and side directions of the vehicle.

In addition to the tire-related information, the controller 11 may calculate or correct the driving control parameter based on a vehicle factor (such as vehicle type) of the second vehicle 5, to which the driving control parameter is transmitted. The vehicle factor may be used for inverse estimation of equivalent cornering power (CP) and the like based on the vehicle travel data (such as CAN data).

The controller 11 may estimate each piece of the tire-related information from the vehicle travel data. For example, the controller 11 may estimate the wear condition of the tire 4 from the running distance.

The tire-related information may differ for each of the tires 4 mounted on the first vehicle 3. The controller 11 may calculate the driving control parameter based on representative values for tires (for example, average of left and right wheels or average of four wheels). As an alternative example, the controller 11 may transmit to the second vehicle 5 a representative value of the driving control parameter (such as a four wheel average) calculated based on the wear condition or the internal pressure of each tire.

When using the road surface condition information as the tire-related information, the controller 11 may acquire the tire-related information from a plurality of vehicles. The tire-related information may then be acquired via inter-vehicle communication.

Here, gain is a value that indicates responsiveness to driving operations. For example, the smaller the gain, the harder the vehicle is to turn when steering. The smaller the gain, the harder the vehicle is to stop when braking. When tire gain is fixed in driving control, controllability of the vehicle changes gradually with changes in the tire-related information. Therefore, the controller 11 detects gain change from the tire-related information and calculates the driving control parameter to cope with the gain change. For example, the controller 11 may calculate the driving control parameter so that the gain change returns to the state before the change, or the controller 11 may calculate the driving control parameter so that the gain increases or decreases.

Specific examples of how the driving control parameter is calculated from the tire-related information, including the vehicle travel data, are described below.

<Example of Calculating Driving Control Parameter from Tire-Related Information>

Figure 6:
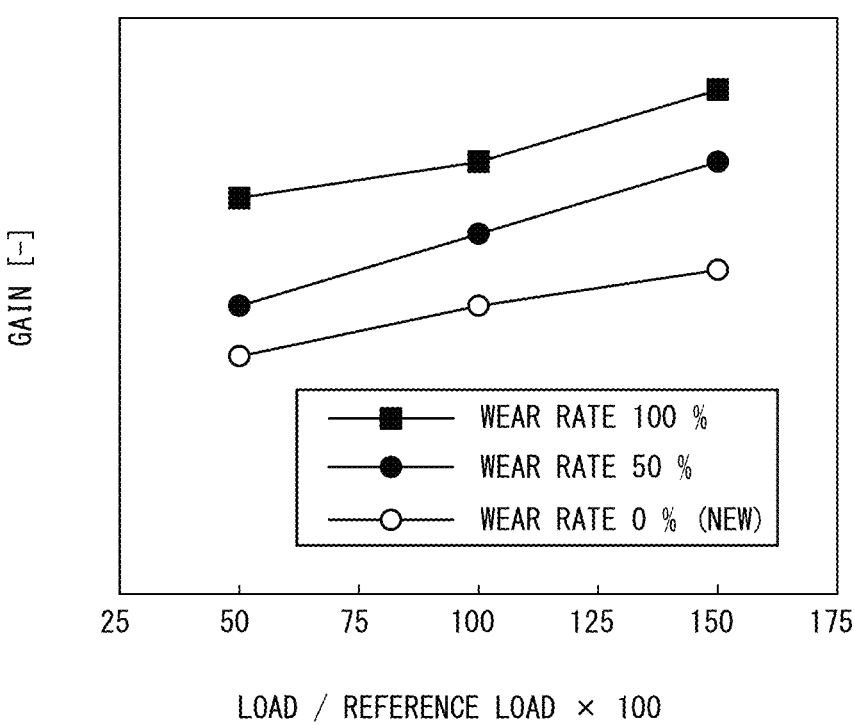
FIG. 6 is a graph illustrating gain change with wear rate and load.

As a first example, the controller 11 acquires the load and wear condition as the tire-related information. As illustrated in FIG. 6, the gain increases as the load increases. The gain increases as the wear rate increases.

Figure 7:
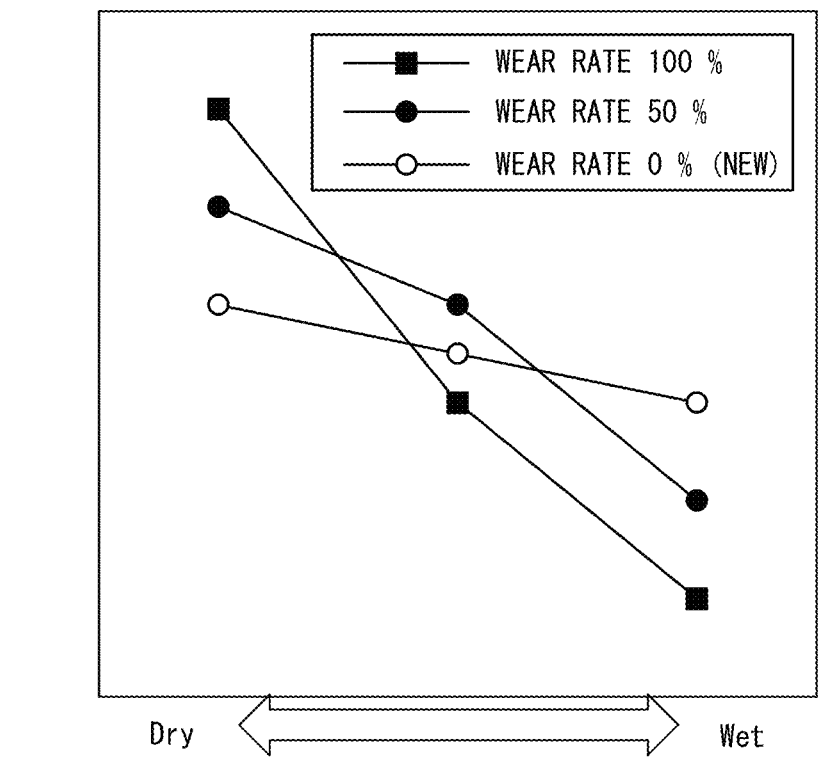
FIG. 7 is a graph illustrating gain change with wear rate and road surface condition.

As a second example, the controller 11 acquires the road surface condition and the wear condition as the tire-related information. As the tire 4 wears, the tread becomes thinner and the grooves shallower. Shallow grooves increase tread stiffness, so the gain increases during dry road conditions as indicated in FIG. 7 (corresponding to "Dry"). Conversely, in wet road conditions (corresponding to "Wet"), the more worn the tire 4 is, the more slippery, because of poor drainage. Thus, gain is reduced.

<Example of Calculating Driving Control Parameter from Vehicle Travel Data>

Figure 8:
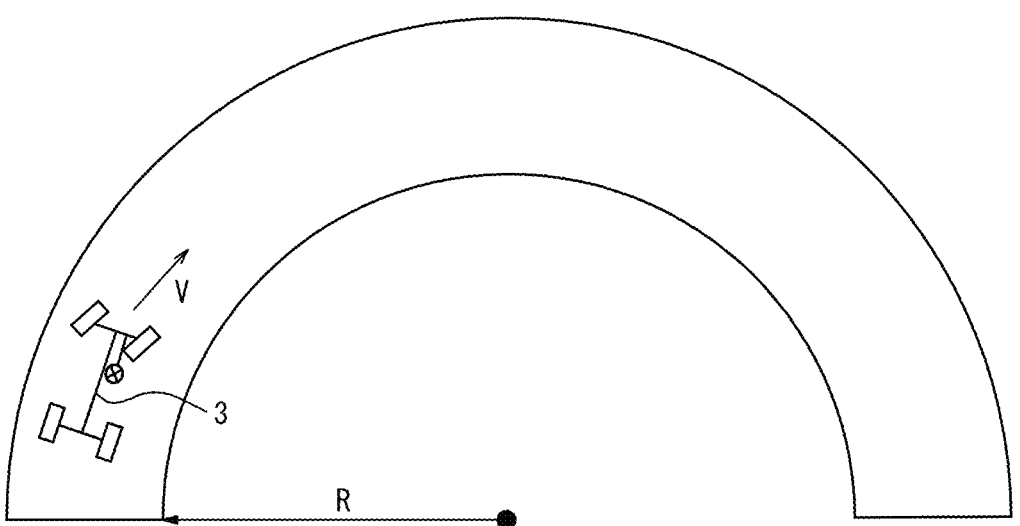
FIG. 8 is a diagram illustrating a cornering situation of the first vehicle.

As a first example, as illustrated in FIG. 8, when a turning radius R of the first vehicle 3 is known from position information such as Global Positioning System (GPS), the controller 11 is able to calculate lateral G from the turning radius R and vehicle speed V. The controller 11 is able to estimate the gain change of the tire 4 based on the relationship between the lateral G, the amount of steering wheel operation, and the turning radius R. At such a time, the controller 11 estimates the gain change based on the property that the amount of steering wheel operation that establishes the equation of motion changes depending on the wear condition. For example, the controller 11 is able to estimate a mass point system p together with load estimation such as Contact Area Information Sensing (CAIS) (analysis of in-tire accelerometer data).

For example, the controller 11 is able to determine that the gain of the tire 4 has increased because the amount of steering wheel steering required has decreased. When raining, the controller 11 is able to detect a decrease in drainage and decrease in gain due to wear as a result of increased steering wheel steering.

In FIG. 8, a two-wheel model is used as the vehicle model for the first vehicle 3. As an alternative example, a two degree of freedom mass system model may be used as the vehicle model for the first vehicle 3.

As a second example, the controller 11 is able to estimate that tire gain relative to front-rear G has changed based on an amount of braking applied to the first vehicle 3 and braking distance calculated from position information. In this case, the controller 11 is able to estimate the mass point system p together with load estimation such as CAIS, for example.

For example, the controller 11 determines that the amount of braking required in fair weather has decreased, and therefore tire gain has increased. The controller 11 is able to detect a decrease in drainage and a decrease in gain due to wear as a result of increased brake operation amount during wet weather.

The controller 11 may use an estimation device called a state observer in the calculation of the driving control parameter. As a backup in the system, the estimation device is able to run the vehicle travel data through an optimized filter to estimate unmeasurable gain and p.

<Another Example of Calculating Driving Control Parameter from Vehicle Travel Data>

As a first example, the controller 11 may calculate the control parameter from change over time of the Lissajous waveform of "vehicle side input of force vs. vehicle response" of the vehicle travel data. The relationship between vehicle side input of force and vehicle response is as follows.

TABLE 1

| Vehicle side input of force | Vehicle response |
|---|---|
| Steering angle | Roll angle |
| | Pitch angle |
| | Yaw angle |
| | Roll angle speed (roll rate) |
| | Pitch angle speed (pitch rate) |
| | Yaw angle speed (yaw rate) |
| | Front-rear speed |
| | Left-right speed |
| | Up-down speed |
| | Travel speed |
| | Body slip angle |
| Accelerator pedal position | Pitch angle |
| | Pitch angle speed (pitch rate) |
| | Travel speed |
| Brake pressure, brake pedal position | Pitch angle |
| | Pitch angle speed (pitch rate) |
| | Front-rear speed |
| | Travel speed |

As a second example, the controller 11 may estimate the Magic Formula (MF) tire model based on the "vehicle side input of force vs. vehicle response" of the vehicle travel data and calculate the control parameter using the estimated tire model. The vehicle response may be predicted based on the vehicle side input of force and vehicle and tire simulation models, and therefore when provided with the vehicle model, the controller 11 is able to estimate the tire model from the vehicle-side input of force and the vehicle response.

The controller 11 may remove tire effects (such as vertical/horizontal springs, rotational springs) in the vehicle model (simulation) based on the tire-related information (such as wear condition).

<Example of Calculating Tire-Related Information from Vehicle Travel Data>

As a first example, the controller 11 may calculate a dynamic loaded radius from the vehicle speed and tire rotation speed, and calculate the wear condition of the tire 4 from the difference between the calculated dynamic loaded radius and the dynamic loaded radius of a new tire.

As a second example, the controller 11 may determine the tire wear condition of the tire 4 from sprung mass vibration (acceleration), which is one piece of the vehicle travel data. The wear condition may be determined from vibration information previously acquired for each wear condition or from vibration simulation.

As a third example, the controller 11 may inversely estimate the road surface p (tire p) from the current behavior of the first vehicle 3 and the wear condition of the tire 4.

[Transmission of Driving Control Parameter]

The controller 11 transmits the driving control parameter that is calculated to the second vehicle 5 via the communicator 12. Transmission may be executed in response to a request at OS startup in the second vehicle 5. As an alternative example, when the tire-related information is acquired from the first vehicle 3, the driving control parameter may be transmitted to the first vehicle 3 identified by the vehicle identification information.

According to the present embodiment, the controller 11 may impose a fee on the recipient for providing the driving control parameter. In determining the fee to be charged for providing the driving control parameter, the controller 11 may calculate the fee based on the number of requests from the second vehicle 5.

[Driving Control]

The second vehicle 5 acquires the driving control parameter from the information processing device 1. The driving control parameter is a parameter corresponding to the tire-related information.

The driving control device 51 of the second vehicle 5 controls driving based on the driving control parameter. The driving control parameter may be applied to at least one gain of acceleration or deceleration (front-rear G), or steering (lateral G) of the second vehicle 5.

The driving control device 51 may have different gains for acceleration and deceleration for the same driving control parameter. The driving control device 51 may change the gain depending on the load on each wheel.

[Sequence Diagram]

Figure 9:
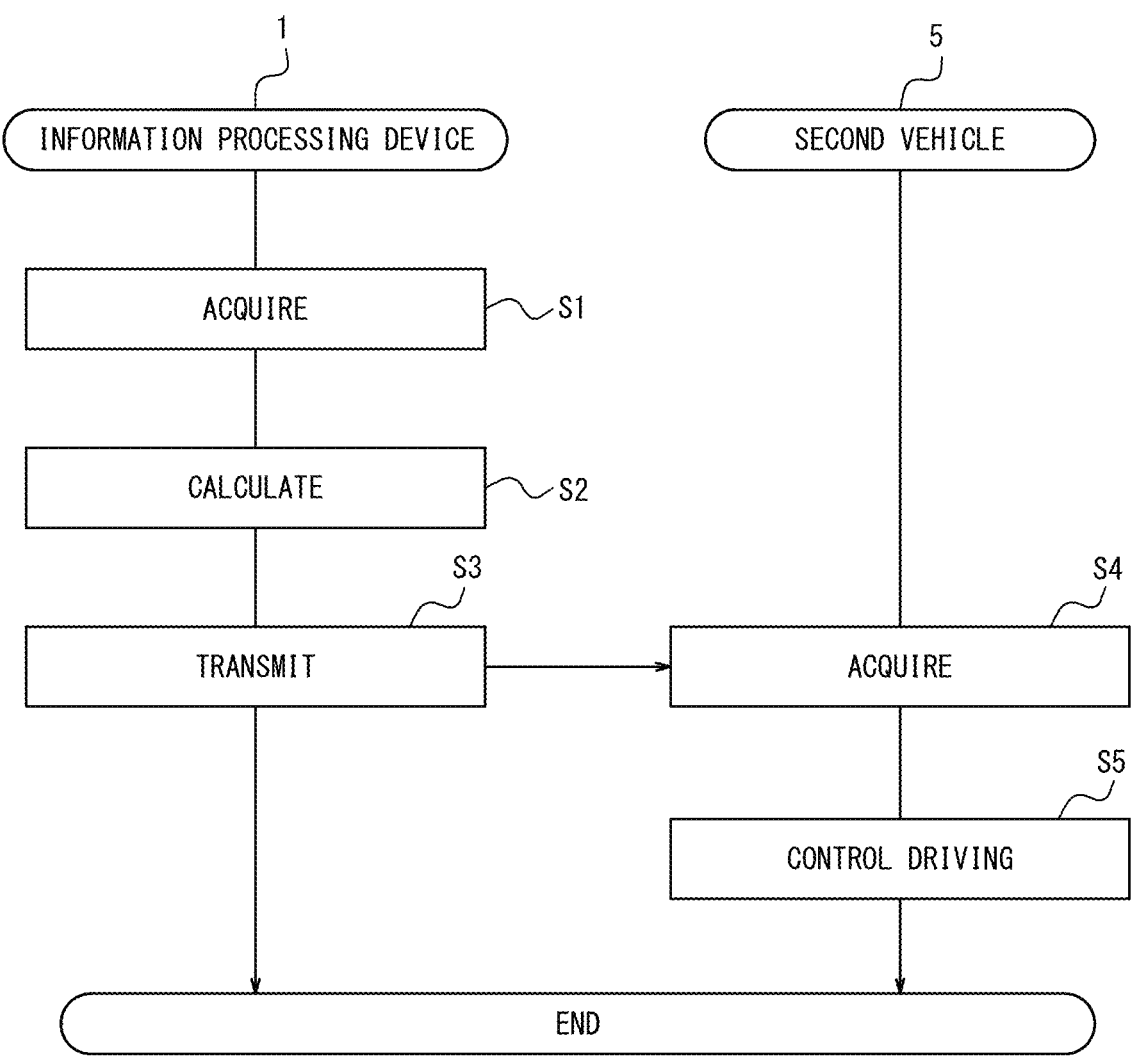
FIG. 9 is a flowchart illustrating operation of an information processing device and the second vehicle.

The information processing method and the driving control method executed by the controller 11 of the information processing device 1 and the driving control device 51 of the second vehicle 5 are described, with reference to FIG. 9.

In step S1, the controller 11 acquires the tire-related information via the network.

In step S2, the controller 11 calculates the driving control parameter based on the tire-related information.

In step S3, the controller 11 transmits the driving control parameter to the second vehicle 5.

In step S4, the second vehicle 5 acquires the driving control parameter from the information processing device 1.

In step S5, the second vehicle 5 executes the driving control of the second vehicle 5 based on the driving control parameter acquired.

As described above, according to the present embodiment, the controller 11 executes operations including acquiring the tire-related information, calculating the driving control parameter based on the tire-related information, and transmitting the driving control parameter to the second vehicle 5. In this way, the information processing device 1 calculates the driving control parameter, thus improving the controllability of the vehicle.

Further, according to the present embodiment, the operations of the controller 11 include acquiring the tire-related information and vehicle identification information from the first vehicle 3 and transmitting the driving control parameter to the vehicle identified by the vehicle identification information. Further, the operations include acquiring the tire-related information from the tires 4 of the first vehicle 3. Further, the operations include acquiring the tire-related information from an external information processing device. This configuration allows the information processing device 1 to acquire a variety of tire-related information, which enables calculation of an optimal driving control parameter.

Further, according to the present embodiment, the operations include, when at least some of the tire-related information cannot be acquired, calculating the driving control parameter corresponding to the maximum risk tire situation. This configuration allows the information processing device 1 to reduce the risk of accidents and the like.

Further, according to the present embodiment, the operations include calculating the driving control parameter based on a vehicle factor of the second vehicle 5 to which the driving control parameter is to be transmitted. This configuration allows the information processing device 1 to calculate the driving control parameter suitable for the individual circumstances of the second vehicle 5.

Further, according to the present embodiment, the operations include transmitting the driving control parameter to the second vehicle 5 in response to a request at the time of OS startup in the second vehicle 5. This configuration allows the information processing device 1 to transmit the driving control parameter early, before the second vehicle 5 starts travel.

Although the present disclosure is described based on the drawings and examples, it should be noted that a person skilled in the art may make variations and modifications based on the present disclosure. Other changes are possible without departing from the spirit of the present disclosure. For example, functions and the like included in each solution and step may be rearranged, and multiple solutions and steps may be combined into one or divided, as long as no logical inconsistency results.

For example, according to the above embodiment, a program that executes all or part of the functions or processing of the information processing device 1 may be recorded on a computer-readable recording medium. Here, computer-readable recording medium includes a non-transitory computer-readable medium, for example, a magnetic recording device, an optical disk, a magneto-optical recording medium, or a semiconductor memory. Program distribution may be achieved, for example, by selling, transferring, or lending a portable recording medium such as a digital versatile disc (DVD) or compact disc read-only memory (CD-ROM) on which the program is recorded. Further, program distribution may be achieved by storing the program in storage on any server and transmitting the program from any server to another computer. Further, the program may be provided as a program product. The present disclosure may also be realized as a program executable by a processor.

The computer, for example, temporarily stores in main memory the program recorded on a portable recording medium or transferred from a server. The computer then reads the program stored in the main memory by the processor and executes processing in accordance with the program read by the processor. The computer may read the program directly from a portable recording medium and perform processing according to the program. The computer may sequentially execute processing according to a received program each time the program is transferred from a server to the computer. Processing may be performed by ASP services that do not transfer the program from the server to the computer, but only realize functions by instruction execution and result acquisition. "ASP" is an abbreviation for application service provider. Here, program includes information that is used for processing by a computer that is equivalent to a program. For example, data that is not a direct command to a computer but has the property of prescribing computer processing falls under the category of "equivalent to a program".

REFERENCE SIGNS LIST

S information processing system
NW network
1 information processing device
11 controller
12 communicator
13 storage

2 external information processing device
3 first vehicle
31 driving control device
32 ECU
33 CAN Bus
34 user device
35 robocar PC
4 tire
5 second vehicle
51 driving control device
52 user device
53 robocar PC
54A acceleration
55A brake
56A steering
57A shift
54B to 57B sensors
54C to 57C ECU

The invention claimed is:

1. An information processing device able to communicate with a vehicle via a network, comprising a controller, the controller being configured to execute operations comprising:

acquiring tire-related information;

detecting a change in a tire gain based on the tire-related information;

calculating a driving control parameter based on the tire-related information to cope with the change in the tire gain; and transmitting the driving control parameter to the vehicle to cause the vehicle to control driving based on the driving control parameter, wherein the tire gain indicates a responsiveness of the vehicle to a driving operation.

2. The information processing device according to claim 1, wherein the operations further comprise:

acquiring the tire-related information and vehicle identification information from the vehicle; and transmitting the driving control parameter to the vehicle identified by the vehicle identification information.

3. The information processing device according to claim 2, wherein the operations further comprise acquiring the tire-related information from a tire of the vehicle.

4. The information processing device according to claim 2, wherein the operations further comprise acquiring the tire-related information from an external information processing device.

5. The information processing device according to claim 2, wherein the operations further comprise, when at least some of the tire-related information cannot be acquired, calculating the driving control parameter corresponding to a maximum risk tire situation.

6. The information processing device according to claim 2, wherein the operations further comprise calculating the driving control parameter based on a vehicle factor of the vehicle to which the driving control parameter is to be transmitted.

7. The information processing device according to claim 2, wherein the operations further comprise transmitting the driving control parameter to the vehicle in response to a request at a time to operating system (OS) startup in the vehicle.

8. A non-transitory computer-readable medium storing a program configured to cause a computer to function as the information processing device according to claim 2.

9. The information processing device according to claim 1, wherein the operations further comprise acquiring the tire-related information from a tire of the vehicle.

10. The information processing device according to claim 9, wherein the operations further comprise acquiring the tire-related information from an external information processing device.

11. The information processing device according to claim 1, wherein the operations further comprise acquiring the tire-related information from an external information processing device.

12. The information processing device according to claim 1, wherein the operations further comprise, when at least some of the tire-related information cannot be acquired, calculating the driving control parameter corresponding to a maximum risk tire situation.

13. The information processing device according to claim 1, wherein the operations further comprise calculating the driving control parameter based on a vehicle factor of the vehicle to which the driving control parameter is to be transmitted.

14. The information processing device according to claim 1, wherein the operations further comprise transmitting the driving control parameter to the vehicle in response to a request at a time to operating system (OS) startup in the vehicle.

15. A non-transitory computer-readable medium storing a program configured to cause a computer to function as the information processing device according to claim 1.

16. An information processing method executable by an information processing device able to communicate with a vehicle via a network, the information processing method comprising:

acquiring tire-related information;

detecting a change in a tire gain based on the tire-related information;

calculating a driving control parameter based on the tire-related information to cope with the change in the tire gain; and transmitting the driving control parameter to the vehicle, wherein the tire gain indicates a responsiveness of the vehicle to a driving operation.

17. A driving control device able to communicate with an information processing device via a network, the driving control device being configured to execute operations comprising:

acquiring from the information processing device a driving control parameter calculated based on tire-related information to cope with a change in a tire gain; and controlling driving of a vehicle based on the driving control parameter, wherein the tire gain indicates a responsiveness of the vehicle to a driving operation.

18. A non-transitory computer-readable medium storing a program configured to cause a computer to function as the driving control device according to claim 17.

* * * * *